Aug. 2, 1949.  I. E. ASKE  2,477,565
ELECTRIC HEATING UNIT AND METHOD OF MAKING
Filed Nov. 28, 1945  2 Sheets-Sheet 1
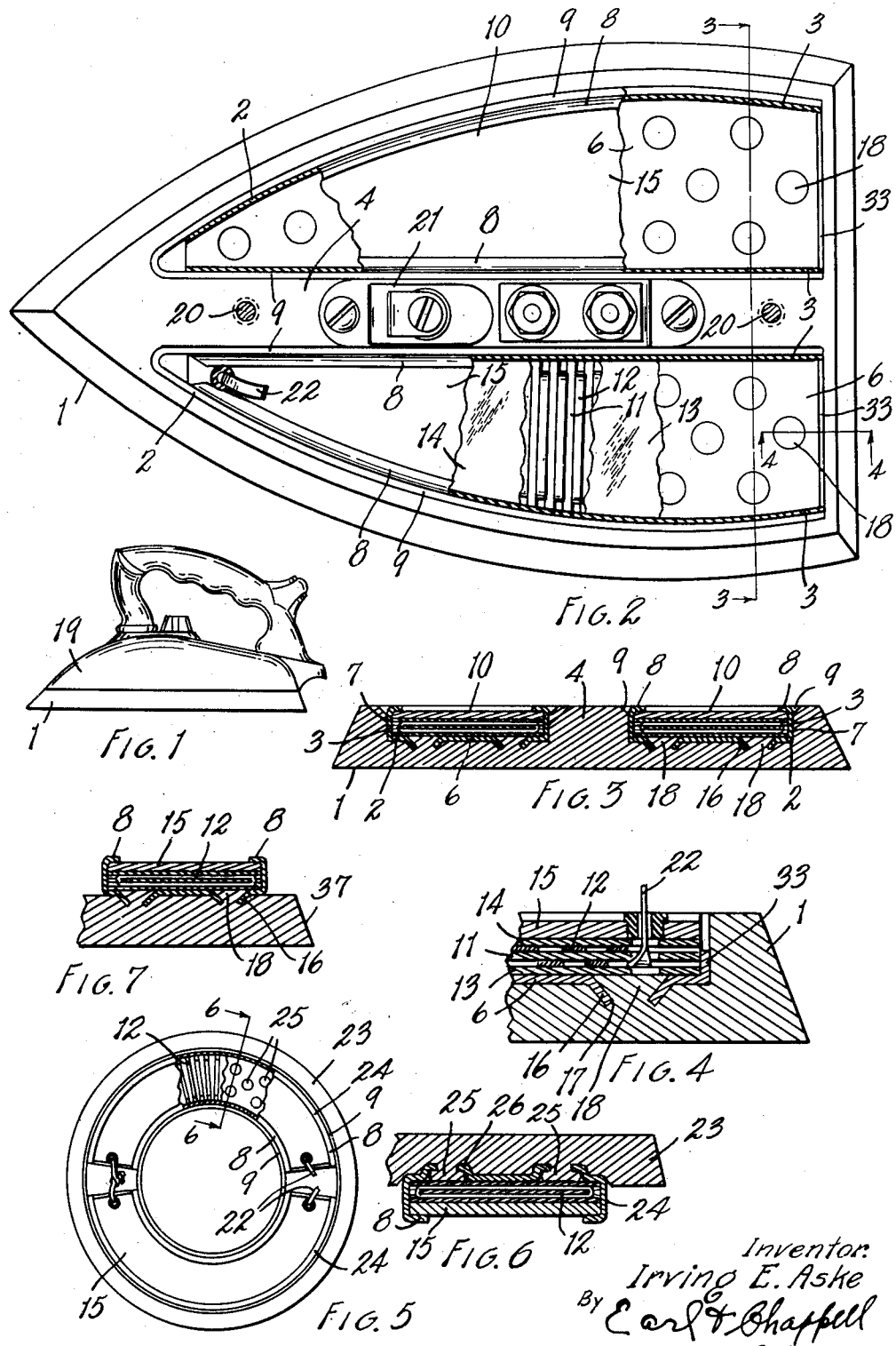
Inventor:
Irving E. Aske
By Earl F. Chappell
Attorneys.

Aug. 2, 1949.   I. E. ASKE   2,477,565
ELECTRIC HEATING UNIT AND METHOD OF MAKING
Filed Nov. 28, 1945   2 Sheets-Sheet 2
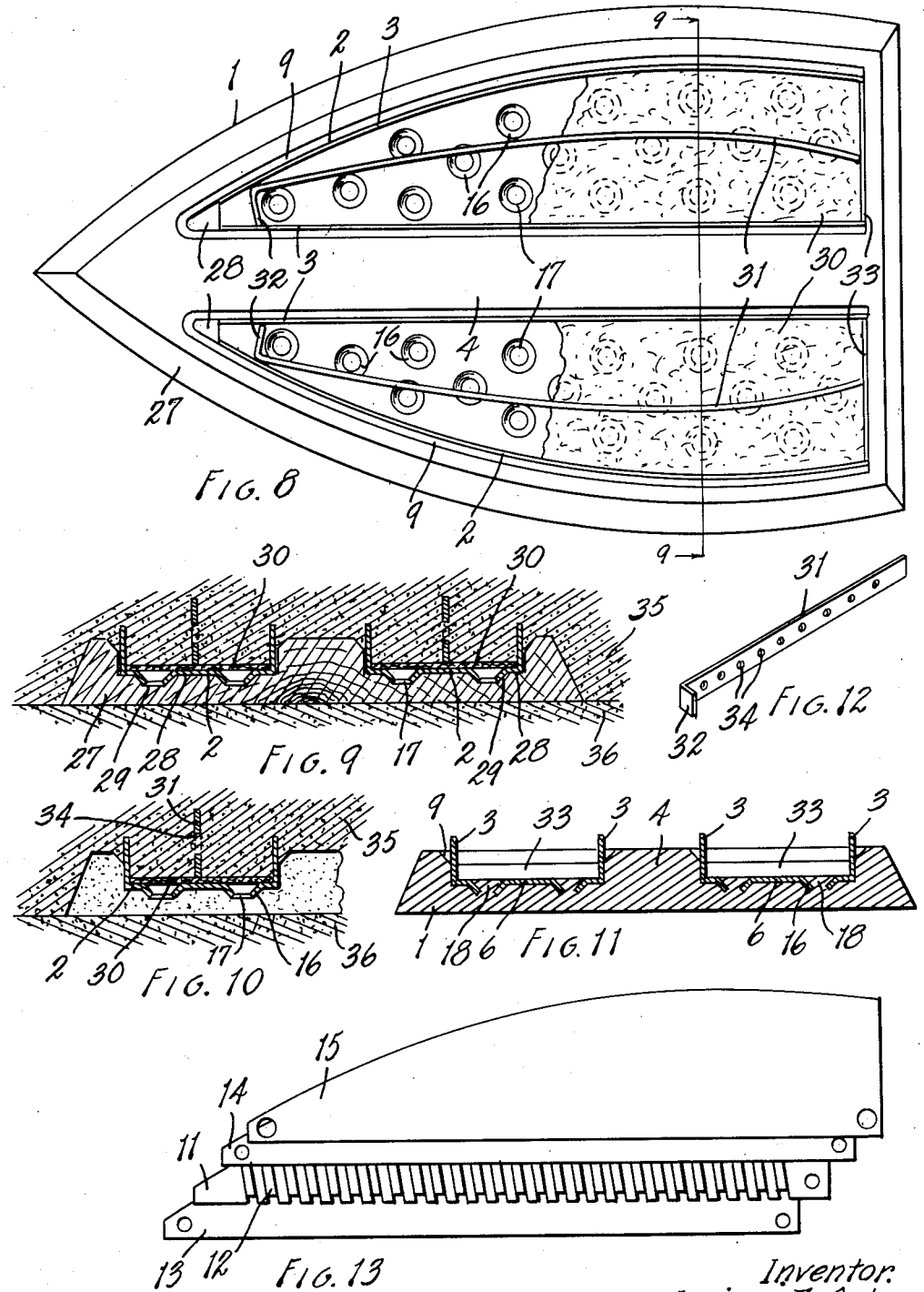
Inventor.
Irving E. Aske
By Earl E. Chappell
Attorneys.

Patented Aug. 2, 1949

2,477,565

UNITED STATES PATENT OFFICE 2,477,565

ELECTRIC HEATING UNIT AND METHOD OF MAKING

Irving E. Aske, Muskegon, Mich.

Application November 28, 1945, Serial No. 631,387

13 Claims. (Cl. 219—25)

This invention relates to improvements in electric heating units and method of making.

The main objects of this invention are:

First, to provide an electric iron in which the sole plate is formed of an aluminum casting having heating element holders formed of sheet aluminum secured thereto to form a very effective means for clamping the heating element in heat transfer relation to the sole plate.

Second, to provide an electric heating unit which is quite uniformly heated throughout its surface.

Third, to provide an electric heating unit which permits easy repair or replacement of the heating element or elements should occasion require.

Fourth, to provide an electric iron in which the sole plate is uniformly heated throughout its surface and relatively little heat is lost by conduction to the cover and handle of the iron.

Fifth, to provide an electric heating unit having embodied therein a bendable sheet metal heating element holder which has a cast riveted joint or union with the body of the casting preventing relative warping or distortion of the holder and the body of the heating unit as a result of variations in temperature.

Sixth, to provide an electric heating unit structure having these advantages which may be very economically produced.

Objects relating to details and economies of the invention will definitely appear from the description to follow. The invention is defined in the claims.

A structure which embodies the features of the invention is clearly illustrated in the accompanying drawing in which:

Fig. 1 is a side elevation of an electric iron embodying my invention.

Fig. 2 is fragmentary plan view of the sole plate or body of the iron with parts broken away to show structural details of the heating element holders and the relation of the heating elements thereto, the structure being shown in approximately commercial size or dimensions.

Fig. 3 is a transverse section on line 3—3 of Fig. 2.

Fig. 4 is an enlarged fragmentary section on line 4—4 of Fig. 2.

Fig. 5 is a fragmentary inverted view of an electric grill or the like.

Fig. 6 is an enlarged fragmentary view in section on a line corresponding to line 6—6 of Fig. 5.

Fig. 7 is a fragmentary view in section through a heating element holder of a modified form or embodiment of my invention.

Fig. 8 is a fragmentary plan view illustrating certain of the steps in the manufacture of heating units embodying my invention.

Fig. 9 is a cross sectional view on a line corresponding to line 9—9 of Fig. 8 showing further steps in the forming of the mold.

Fig. 10 is a fragmentary view corresponding to that of Fig. 9 with the pattern removed from the mold.

Fig. 11 is a cross sectional view of the casting produced by the mold.

Fig. 12 is a perspective view of a springable retainer for use in holding the sheet asbestos dam or stop-off employed in forming the mold.

Fig. 13 is an exploded view of one of the heating elements of the structure illustrated.

This invention is an adaptation of and improvements upon the electric iron heating unit disclosed in my co-pending application, Serial No. 614,639, filed September 6, 1945, for Electric irons.

I have illustrated my invention as embodied in an electric sadiron and also as embodied in an electric grill or plate, but it will be understood that the invention is adaptable for embodiment in other forms of electrical appliances such as waffle irons, pressure cookers, and the like which have cast body portions to be electrically heated.

Referring to the drawing, I represents the sole plate or body of an electric iron which is desirably formed of cast aluminum or other non-ferrous metal, one of the objects and results of the invention being the making of electric irons of non-ferrous metal such as aluminum which are not likely to warp or become distorted as the result of the heating and cooling to which they are subjected in use. In the structure illustrated I provide two laterally spaced heating element holders 2, these being formed of sheet aluminum where the cast body is formed of cast aluminum or of sheet brass or copper where the body is formed of brass or copper, so that these parts have substantially the same coefficients of expansion. The holders 2 are formed in tray-like or channel section providing bendable side walls 3. These holders taper longitudinally in the embodiment illustrated, to correspond to the shape of the iron and are spaced to provide an integral mid-rib 4 between them. The body metal or sole plate metal is cast upon these holders, the cast metal contacting the bottoms 6 of the holders and desirably substantial portions of the sides 7 thereof. However, it is considerable advantage to have upper edge portions of the holders project from the casting to constitute heating element clamping flange portions 8 and also to provide along the edges of the castings groove-like recesses 9 which facilitate the turning of the flanges 8 inwardly upon the holders.

The heating elements designated generally by the numeral 10 comprise supports 11 of insulating material such as isinglass having the resistance strands or wires 12 wound spirally thereon. Bottom and top insulating strips or plates 13 and 14 are provided and top clamping plates 15, these being of substantial thickness and conformed to fit closely within the holders. The heating elements are disposed in the holders and the flanges 8 clamp down upon the top plates, clamping the heating unit firmly against the bottoms of the holders, thereby providing good heat exchange contact and also clamping the top plates into heat exchange contact with the heating element and the parts constituting the heating elements are firmly clamped in retaining and heat exchange relationship.

The flanges 8 are desirably of substantial width and form a good heat exchange engagement with the top plates, the heat being transmitted thereby to the surrounding portions of the sole plate. The bottoms of the holders are formed with downwardly tapering depressions or recesses 16 formed by striking or punching down portions of the bottom, preferably at fairly uniformly distributed points throughout the area thereof. These portions are open at the bottom at 17 so that when the metal is cast upon the holders rivet-like lugs 18 enter and fill the depressions securely anchoring the holders to the sole plate or body of the heating unit. The metal being in cast engagement with the holders forms a good heat contact engagement therewith but the holders are well anchored by these rivet-like portions of the casting. The down-struck portions 16 are also embedded in the casting and this forms a further anchorage. The top portion 19 is provided with a suitable handle and control switch, and is secured to the sole plate by screws 20.

The thermostat 21 is mounted on the midrib 4. The electrical connections to a source of power are indicated at 22. These details are no part of my present invention and it will be understood that the particular design illustrated in Figs. 1 to 4 is arbitrary.

In Figs. 5 and 6 I illustrate my invention as embodied in an electric grill 23. In this case the holders 24 are curved and are secured to the under side of the body plate of the grill by means of the rivet-like portions 25 entering the depressions 26. I have not illustrated the housing portions for the electric heating elements.

In Figs. 8 to 12 I illustrate the steps of manufacture which also constitute a part of my present invention. In manufacture I provide a pattern 27 of suitable contour or shape and having recesses 28 formed therein to receive the holders 2, the pattern having recesses 29 receiving the downwardly struck portions 16 of the holders. Sheets of asbestos 30 are arranged in the holders to cover the recesses or openings in the holders. These sheets of asbestos are clamped against the bottoms by means of the springable retaining strips 31 which have offset ends 32 engaged between the converging sides of the holders as shown in Fig. 8, the other ends of the retaining strips being sprung into the upturned end flanges 33 of the holders, see Fig. 8. These retaining strips 31 have a series of holes 34 therethrough.

The mold is formed with suitable mold material 35, 36, the mold material entering into the holes of the retaining strip thereby constituting anchors for the holders when the pattern is withdrawn. When the pattern is withdrawn the holders are supported in the mold to constitute the parts of the mold cavity wall. When the metal is poured portions of the molten metal enter the openings in the bottom of the holders, forming the rivet-like integral retaining lugs described. The asbestos sheets prevent the metal from flowing on to the inner sides of the holders which would result in the necessity for machining or cleaning. The holders are without further preparation other than cleaning the mold sand therefrom ready to receive the heating elements. While it is of substantial manufacturing advantage to have the edges of the the holders extend substantially above the casting, fair results can be obtained with the edges flush with the casting, and the sides of the holders can be pried away from the casting and folded upon the heating element. It is desirable to use holders of sheet aluminum for an aluminum casting and brass holders for a brass casting as the holders and castings will then expand and contract in substantially the same amount for variations in temperature and therefore no shearing stresses will result which might tend to loosen the securing effect of the cast securing lugs or to cause the parts to warp.

In the embodiment shown in Fig. 7 the holder 2 is disposed on the surface of the body casting 37 but it is desirable to have the holders embedded to a substantial extent in the body casting as that furnishes additional heat transfer surface, and also in an electric sadiron the edges and midrib of the sole plate facilitate the heat exchange and distribution of the heat. One of the advantages of the invention as shown in the embodiment of Figs. 1 to 4 is that the face of the iron is very uniformly heated.

I have illustrated and described my invention in highly practical embodiments. I have not attempted to illustrate various modifications which are possible as I believe this disclosure will enable the adaptation of my invention as may be desired.

Having thus described my invention what I claim as new and desire to secure by Letters Patent is:

1. An electric iron comprising a cast sole plate body member of non-ferrous metal having laterally spaced upwardly facing sheet metal heating element holders of channel section and of the same kind of non-ferrous metal as the cast body member, the holders having a plurality of flanged openings in the bottoms thereof, the flanges projecting into the cast body member, integral cast portions of the cast body member filling the openings and constituting cast lugs connecting the holders to the sole plate, the sides of the holders being at least partially surrounded by portions of the body member in cast engagement therewith, upper edge portions of the holders constituting bendable heating element clamping members, heating elements, and top plates therefor disposed in said holders, the heating element clamping members of the holders being bent inwardly into overlapping engagement with the heating element top plates.

2. An electric iron comprising a cast sole plate body member of non-ferrous metal having laterally spaced upwardly facing sheet metal heating element holders of channel section and of the same kind of non-ferrous metal as the cast body member, the holders having a plurality of flanged openings in the bottoms thereof, the flanges projecting into the cast body member, integral cast portions of the cast body member filling the openings and constituting cast lugs connecting the holders to the sole plate, the sides of the holders being at least partially surrounded by portions of the body member in cast engagement therewith, upper edge portions of the holders constituting bendable heating element clamping members.

3. An electric iron comprising a cast sole plate body member of non-ferrous metal having laterally spaced upwardly facing bendable sheet metal heating element holders of channel section and of the same kind of non-ferrous metal as the cast body member, the holders having a plurality of openings in the bottoms thereof, integral cast portions of the cast body member filling the openings and constituting cast lugs connecting the holders to the sole plate, the sides of the holders constituting bendable heating element securing members.

4. An electric heating unit comprising a cast aluminum body member having a sheet aluminum heating element holder, the body member having cast engagement with the holder, the holder having a plurality of openings into which portions of the cast body member project and constitute integral retaining lugs for said holder, the sides of the holder being at least partially surrounded by the cast body member with portions of the cast body member having cast engagement therewith, outer edge portions of said holder constituting bendable heating element retaining elements, a heating unit disposed in said holder, said holder retaining elements being in retaining engagement with said heating unit and clamping the same in heat exchange engagement within the holder.

5. A heat transfer plate for an electric heating unit comprising a cast aluminum body member having a sheet aluminum heating element holder, the body member having cast engagement with the holder, the holder having a plurality of openings into which portions of the cast body member project and constitute integral retaining lugs for said holder, the sides of the holder being at least partially surrounded by the cast body member, portions of the holder constituting bendable heating element retaining elements.

6. A heat transfer plate for an electric heating unit comprising a cast metal sole plate body member having an upwardly facing heating element holder of bendable sheet metal corresponding to the cast metal sole plate and of channel section, the holder element having openings therein, the cast metal of the body member entering and fitting within said openings and constituting rivet-like lugs connecting the holder to the sole plate, the upper edge portions of said holder constituting bendable flanges for securing a heating element within the holder.

7. A heating unit comprising a cast body member having a sheet metal heating element holder of outwardly facing channel section cast thereto, the holder having holes therein into which integral portions of the cast body extend providing integral rivet-like connection for the holder to the cast body, the flanges of said holder constituting bendable heating element retaining members, said cast body member and holder member being of metal having substantially the same coefficient of expansion, a heating element disposed within said holder, portions of said holder being turned inwardly upon said heating element in heat transfer relation thereto, the holder being substantially surrounded by the cast body which has cast engagement therewith.

8. A heating unit comprising a cast body member having a sheet metal heating element holder of outwardly facing channel section cast thereto, the holder having holes therein into which integral portions of the cast body extend providing integral rivet-like connections for the holder to the cast body, the flanges of said holder constituting bendable heating element retaining members, said cast body member and holder member being of metal having substantially the same coefficient of expansion, and a heating element disposed within said holder, portions of said holder being turned inwardly upon said heating element in heat transfer relation thereto.

9. The method of making a heating transfer plate for an electric heating unit comprising the steps of forming a bendable sheet aluminum heating element holder of channel cross section and with conical depressions in the bottom thereof open at their ends, arranging the heating element holder in a recess provided therefor in a body element pattern, forming a mold and withdrawing the pattern, the bottom and a portion of the sides of the holder constituting wall parts of the mold cavity, and making an aluminum casting with the mold whereby the heating element holder is cast embedded in the body and portions of the cast metal enter the depressions in the holder constituting rivet-like holder retaining lugs integral with the casting.

10. The method of making a heating transfer plate for an electric heating unit comprising the steps of forming a bendable sheet metal longitudinally tapered heating element holder of channel cross section and with conical depressions in the bottom thereof open at their ends, arranging a sheet of asbestos on the bottom of the holder to cover the depressions therein, arranging a retaining strip within the holder above said asbestos sheet, the retaining strip being in springable engagement with the holder, arranging the heating element holder in a recess provided therefor in a body element pattern, forming a mold and withdrawing the pattern, the bottom and a portion of the sides of the holder constituting wall parts of the mold cavity, and making a casting with the mold whereby the heating element holder is cast embedded in the body and portions of the cast metal enter the depressions in the holder constituting holder retaining lugs integral with the casting.

11. The method of making a heating transfer plate for an electric heating unit comprising the steps of forming a bendable sheet metal longitudinally tapered heating element holder of channel cross section and with openings in the bottom thereof, forming a mold and withdrawing the pattern, the bottom and a portion of the sides of the holder constituting wall parts of the mold cavity, and making a casting with the mold whereby the heating element holder is cast embedded in the body and portions of the cast metal enter the depressions in the holder constituting holder retaining lugs integral with the casting.

12. The method of making a heating transfer plate for an electric heating unit comprising the steps of forming a bendable sheet metal heating element holder with openings in the bottom thereof, arranging a sheet of asbestos on the bottom of the holder to cover the openings therein and retained in contact with the bottom, arranging the heating element holder on a body element pattern, forming a mold and withdrawing the pattern leaving the holder in the mold to constitute a wall part of the mold cavity, and making a casting with the mold, the metal of the casting being in cast contact with substantial portions of the holder with portions of the cast metal entering the openings in the holder constituting retaining lugs integral with the casting.

13. The method of making a heating transfer plate for an electric heating unit comprising the steps of forming a bendable sheet metal heating element holder with openings in the bottom thereof, arranging a sheet of dam material on the bottom of the holder to cover the openings therein, arranging a retaining strip within the holder, the retaining strip engaging the holder and having holes therein, arranging the heating element holder on a body element pattern, forming a mold and withdrawing the pattern leaving the holder in the mold to constitute a wall part of the mold cavity, and making a casting with the mold, the metal of the casting being in cast contact with the bottom of the holder with portions of the cast metal entering the openings in the holder constituting retaining lugs integral with the casting.

IRVING E. ASKE.

REFERENCES CITED

The following references are of record in the file of this patent:

UNITED STATES PATENTS

| Number | Name | Date |
|---|---|---|
| 1,150,428 | Hadaway | Aug. 17, 1915 |
| 1,474,588 | Hetrick | Mar. 11, 1921 |
| 1,994,676 | Wiegand | Nov. 16, 1933 |
| 1,998,764 | Jordan et al. | Jan. 6, 1934 |